US008223645B2

(12) United States Patent
Sanjeewa

(10) Patent No.: US 8,223,645 B2
(45) Date of Patent: Jul. 17, 2012

(54) COMMUNICATION CONTROL APPARATUS, COMMUNICATION CONTROL METHOD, AND COMMUNICATION CONTROL PROGRAM

(75) Inventor: Ranatunga Vijitha Sanjeewa, Kanagawa (JP)

(73) Assignee: Sony Corporation (JP)

( * ) Notice: Subject to any disclaimer, the term of this patent is extended or adjusted under 35 U.S.C. 154(b) by 131 days.

(21) Appl. No.: 12/381,892

(22) Filed: Mar. 17, 2009

(65) Prior Publication Data

US 2009/0238073 A1 Sep. 24, 2009

(30) Foreign Application Priority Data

Mar. 19, 2008 (JP) ................ P2008-070919

(51) Int. Cl.
H04L 12/26 (2006.01)
(52) U.S. Cl. ........................ 370/235; 370/232
(58) Field of Classification Search .................. 370/230, 370/390, 252, 236; 709/233; 375/242, 240; 725/143; 386/46; 340/825; 382/239
See application file for complete search history.

(56) References Cited

U.S. PATENT DOCUMENTS

| 5,485,147 | A  | * | 1/1996  | Jaffe et al.   | 370/445    |
|-----------|----|---|---------|----------------|------------|
| 2003/0118240 | A1 | * | 6/2003  | Satoh et al.   | 382/239    |
| 2004/0016000 | A1 | * | 1/2004  | Zhang et al.   | 725/143    |
| 2004/0057379 | A1 |   | 3/2004  | Chen et al.    |            |
| 2005/0220188 | A1 | * | 10/2005 | Wang           | 375/240.03 |
| 2006/0104370 | A1 | * | 5/2006  | Yamanaka et al.| 375/242    |
| 2007/0115814 | A1 | * | 5/2007  | Gerla et al.   | 370/230    |
| 2007/0196074 | A1 | * | 8/2007  | Jennings et al.| 386/46     |
| 2008/0037552 | A1 |   | 2/2008  | Dos Remedios et al. |       |
| 2008/0267073 | A1 | * | 10/2008 | Thaler         | 370/236    |
| 2009/0164657 | A1 | * | 6/2009  | Li et al.      | 709/233    |
| 2009/0285211 | A1 | * | 11/2009 | Muramoto et al.| 370/390    |
| 2010/0214943 | A1 | * | 8/2010  | Immendorf et al.| 370/252   |

FOREIGN PATENT DOCUMENTS

| JP | 2002094567 A  | 3/2002  |
| JP | 2005-210347 A | 8/2005  |
| JP | 2006173961 A  | 6/2006  |
| JP | 2006217234 A  | 8/2006  |
| WO | 2004/008675   | 1/2004  |
| WO | 2005006664 A1 | 1/2005  |
| WO | 2005/125116   | 12/2005 |

OTHER PUBLICATIONS

European Search Report, EP 09250646, dated May 12, 2009.
Office Action from Japanese Application No. 2008-070919 dated Apr. 20, 2010.

* cited by examiner

Primary Examiner — Kwang B Yao
Assistant Examiner — Syed M Bokhari
(74) Attorney, Agent, or Firm — Lerner, David, Littenberg, Krumholz & Mentlik, LLP

(57) ABSTRACT

Disclosed herein is a communication control apparatus including: a bandwidth measuring section configured to measure a physical bandwidth of data communication via a communication channel; and a rate control section configured to set a threshold that does not exceed the physical bandwidth measured by the bandwidth measuring section, cause a rate of the data communication to increase exponentially up to the threshold, and cause the rate to decrease when the rate has reached or exceeded the threshold but not reached the physical bandwidth.

8 Claims, 5 Drawing Sheets

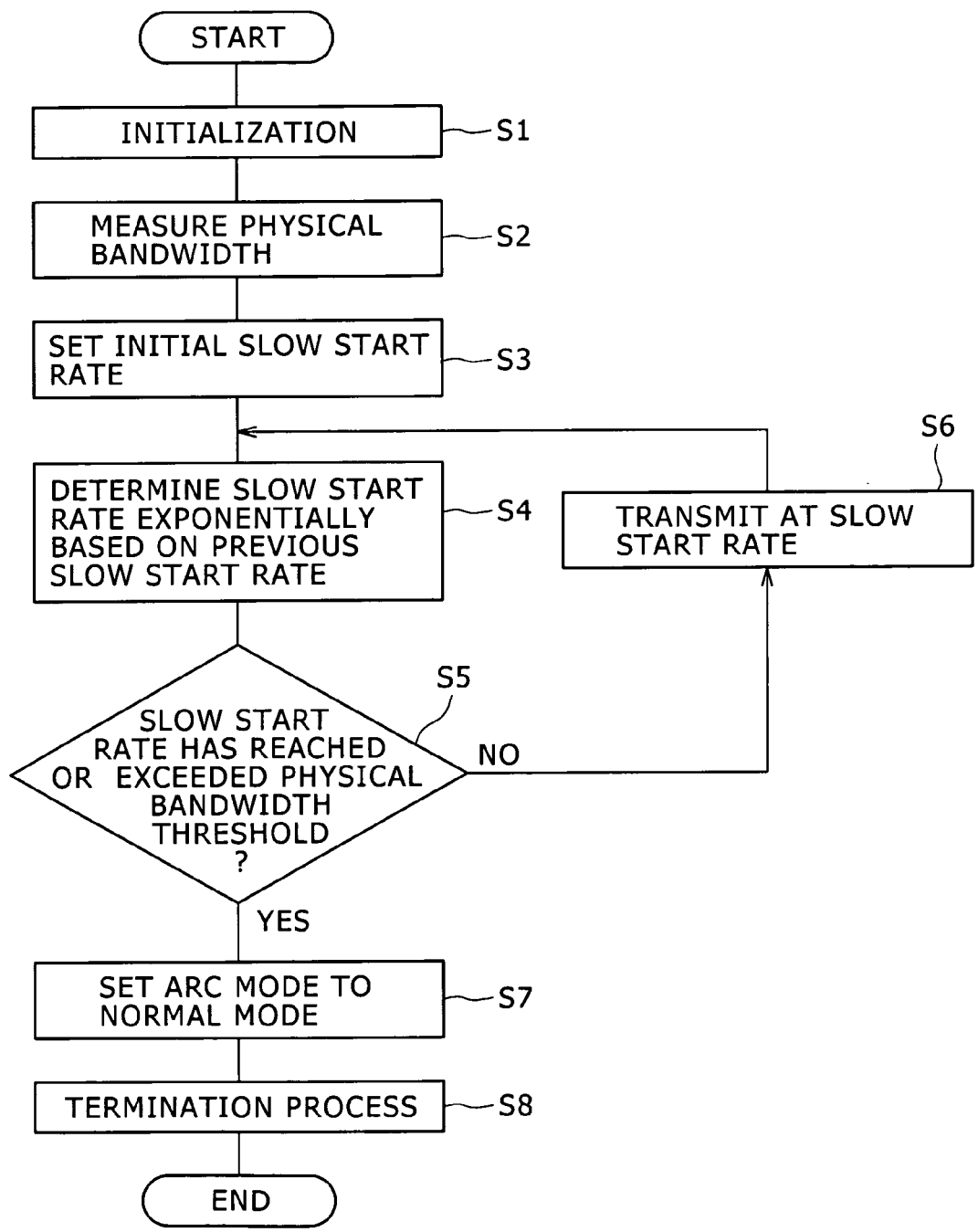

COMMUNICATION CONTROL APPARATUS, COMMUNICATION CONTROL METHOD, AND COMMUNICATION CONTROL PROGRAM

CROSS REFERENCES TO RELATED APPLICATIONS

The present application claims priority from Japanese Patent Application No. JP 2008-070919, filed in the Japanese Patent Office on Mar. 19, 2008, the entire content of which is incorporated herein by reference.

BACKGROUND OF THE INVENTION

1. Field of the Invention

The present invention relates to a communication control apparatus, a communication control method, and a communication control program which perform transfer rate control when data is transferred via a communication channel.

2. Description of the Related Art

Recent years have seen an increase in use of services based on a stream type transmission system, in addition to long-existing services based on a download type transmission system, in data transfer on the Internet. Take transfer of multimedia data such as video files and audio files, for example. In the case of the services based on the download type transmission system, a data file is once downloaded from a distribution server to a receiver terminal, and thereafter the data file is played. Therefore, in the download type transmission system, the file cannot be played until completion of the transfer of the whole file. Thus, the download type transmission system is not suitable for long-time playback, real-time playback, or the like.

In the case of the stream type transmission system, while data is transferred from a transmitter to a reception terminal, that part of the data which has been received can be played. Thus, the stream type transmission system is suitable for use in Internet services such as Internet telephones, remote videoconferencing, and video on demand (see Japanese Patent Laid-open No. 2005-210347).

There is an Internet technique called Real-time Transport Protocol (RTP) defined in IETF RFC 3550. The RTP is suitable for use in the stream type transmission system. In data transfer according to RTP, time stamps are added as time information to packets, and the time stamps are used to recognize temporal relationships between a transmitter and a receiver, so that synchronization can be achieved for playback, free from influence of packet delay variation (jitter) or the like.

Here, RTP does not guarantee real-time data transfer. Priorities, configuration, management, and so on of delivery of the packets are not supported by a transport service provided by RTP. Therefore, like other types of packets, RTP packets may suffer a delay in delivery and packet loss.

Even if such an unfavorable event occurs, the receiver is capable of playing the data using only packets that have arrived in time as expected. This is because, even if video or audio data suffer a little data loss, the playback of the data is possible to some extent. However, user datagram protocol (UDP) has a problem in that UDP does not perform control over the rate of streaming for itself, and may allow transfer of data that exceeds an effective bandwidth of a network. In such a case, some data transmitted may be lost, resulting in deterioration in image quality, and in addition, that may affect traffic in other parts of the network.

There is a technique called Adaptive Rate Control (ARC), which is a technique for improving reliability in the data transfer using RTP. The Adaptive Rate Control (ARC) controls a transfer rate according to an algorithm based on TCP Friendly Rate Control (TFRC) described in RFC 3448 (M. Handley, et al., "TCP Friendly Rate Control (TFRC): Protocol Specification," RFC 3448, 2003).

SUMMARY OF THE INVENTION

Since the Internet is a best-effort network, all network applications need to have a mechanism for adapting to a state of congestion on the network. Here, in order to control network traffic, UDP transfer needs to perform control over congestion similar to TCP, and control a network traffic rate while maintaining real-time quality.

As a basic system used for the network traffic, the ARC system based on TFRC as mentioned above is used. The ARC system uses a rate control method in which the transfer rate is increased exponentially, in a slow-start phase, at the start of the rate control, with the view of reaching a saturation rate as soon as possible.

Here, if the rate is increased in slow start, a loss occurs when a sending rate has exceeded the effective bandwidth of the network, and then the sending rate is decreased greatly in slow start, so that rate control based on normal Additive Increase Multiplicative Decrease (AIMD) (hereinafter referred to as a "normal mode") is started. However, in the case of the slow start where the rate is increased exponentially, the increase in the rate is so dramatic that the rate greatly exceeds a physical bandwidth, resulting in a burst packet loss. If the traffic greatly exceeds the bandwidth available, not only the burst packet loss but also an increase in Round Trip Time (RTT) occurs. Such rate control also affects rate control in the normal mode as required for the packet loss and the RTT value, leading to instability in the start of the rate control.

According to an embodiment of the present invention, there is provided a communication control apparatus including: a bandwidth measuring section configured to measure a physical bandwidth of data communication via a communication channel; and a rate control section configured to set a threshold that does not exceed the physical bandwidth measured by the bandwidth measuring section, cause a rate of the data communication to increase exponentially up to the threshold, and cause the rate to decrease when the rate has reached or exceeded the threshold but not reached the physical bandwidth.

According to the communication control apparatus as described above, the physical bandwidth of the communication channel is measured in advance, and the threshold is set which does not exceed the physical bandwidth measured, and the rate of the data communication is increased exponentially up to this threshold, for example, in the slow start, so that the starting transfer rate may be kept within the physical bandwidth, and thereafter, when the rate has reached or exceeded the threshold but not reached the physical bandwidth, the rate is decreased. Thus, despite application of the exponential increasing of the rate, for example, in the slow start, the rate never exceeds the physical bandwidth during the data communication.

Here, the rate control section may start rate control via a normal mode when causing the rate to decrease. This prevents a drastic decrease in the rate after the rate has reached or exceeded the threshold but not reached the physical bandwidth, allowing optimum rate variation.

The threshold set may be a value in the range of 70% to 90% of the physical bandwidth. This would allow data transfer to progress at rates close to and not exceed the physical bandwidth, even though the rate exceeds the threshold.

According to another embodiment of the present invention, there is provided a communication control method including the steps of: measuring a physical bandwidth of data communication via a communication channel; and setting a threshold that does not exceed the physical bandwidth measured, causing a rate of the data communication to increase exponentially up to the threshold, for example, in slow start, and causing the rate to decrease when the rate has reached or exceeded the threshold but not reached the physical bandwidth, thereby accomplishing rate control. An example of the communication channel is an Internet Protocol (IP) network, e.g., the Internet.

According to the communication control method as described above, the physical bandwidth of the communication channel is measured in advance, and the threshold is set which does not exceed the physical bandwidth measured, and the rate of the data communication is increased exponentially up to this threshold, for example, in the slow start, so that the starting transfer rate may be kept within the physical bandwidth, and thereafter, when the rate has reached or exceeded the threshold but not reached the physical bandwidth, the rate is decreased. Thus, despite application of the exponential increasing of the rate, for example, in the slow start, the rate never exceeds the physical bandwidth during the data communication.

According to yet another embodiment of the present invention, there is provided a communication control program for causing a computer to execute the steps of: measuring a physical bandwidth of data communication via a communication channel; and setting a threshold that does not exceed the physical bandwidth measured, causing a rate of the data communication to increase exponentially up to the threshold, for example, in slow start, and causing the rate to decrease when the rate has reached or exceeded the threshold but not reached the physical bandwidth, thereby accomplishing rate control.

According to the communication control program as described above, in the data communication by the computer via the communication channel, the physical bandwidth of the communication channel is measured in advance, and the threshold is set which does not exceed the physical bandwidth measured, and the rate of the data communication is increased exponentially up to this threshold, for example, in the slow start, so that the starting transfer rate may be kept within the physical bandwidth, and thereafter, when the rate has reached or exceeded the threshold but not reached the physical bandwidth, the rate is decreased. Thus, despite application of the exponential increasing of the rate, for example, in the slow start, the rate never exceeds the physical bandwidth during the data communication.

The present invention achieves the following effects. That is, in the data transfer via the communication channel, stable transfer start can be accomplished, without the physical bandwidth of the communication channel being exceeded substantially. Also, because the physical bandwidth is not exceeded substantially, occurrence of burst packet loss can be prevented, so that proper data transfer can be achieved by a transmitter even in a starting phase. Also, because the transfer rate does not exceed the physical bandwidth during the data communication, control over network traffic can be achieved to maintain stable RTT.

BRIEF DESCRIPTION OF THE DRAWINGS

FIG. 3 is a flowchart for explaining a communication control program according to this embodiment;

DETAILED DESCRIPTION OF THE PREFERRED EMBODIMENTS

Hereinafter, preferred embodiments of the present invention will be described with reference to the accompanying drawings.

<Configuration of Communication System to which Communication Control Apparatus is Applied>

Figure 1:
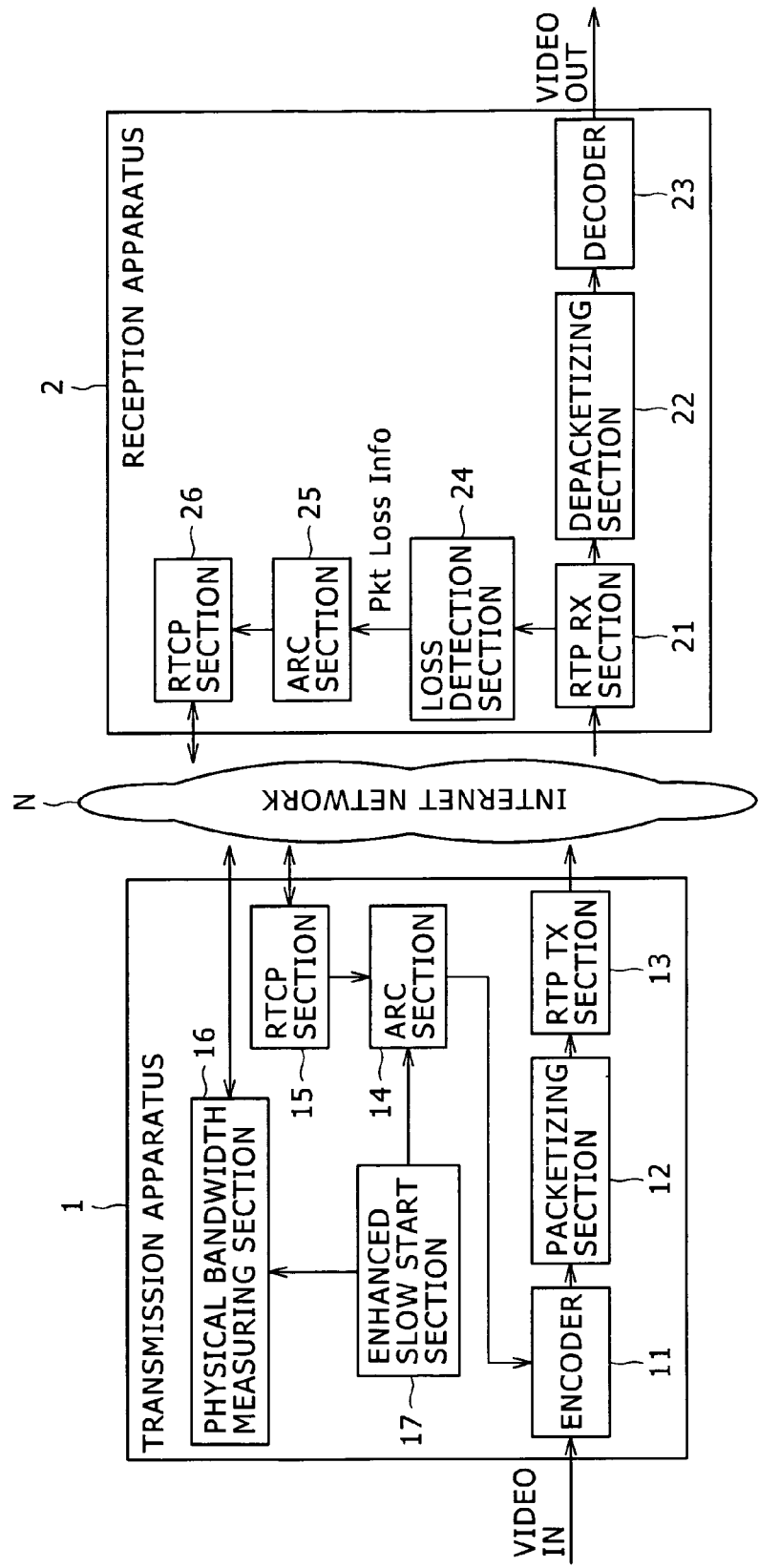
FIG. 1 illustrates the configuration of a communication system to which a communication control apparatus according to an embodiment of the present invention is applied.

FIG. 1 illustrates the configuration of a communication system to which a communication control apparatus according to an embodiment of the present invention is applied. The communication control apparatus according to the present embodiment is primarily applied to a transmission apparatus 1 in the communication system as illustrated in FIG. 1.

This communication system transfers, for example, video data over the Internet, which is an example of a communication channel. The communication system includes the transmission apparatus 1, a reception apparatus 2, and an Internet network N. The transmission apparatus 1 and the reception apparatus 2 are connected to each other via the Internet network N.

The transmission apparatus 1, to which the communication control apparatus according to the present embodiment is applied, includes an encoder 11, a packetizing section 12, an RTP TX section 13, an ARC section 14, an RTCP section 15, a physical bandwidth measuring section 16, and an enhanced slow start section 17. On the other hand, the reception apparatus 2 includes an RTP RX section 21, a depacketizing section 22, a decoder 23, a loss detection section 24, an ARC section 25, and an RTCP section 26.

(Structure of Transmission Apparatus)

The encoder 11 is a part for taking a video signal that is to be transferred, and compressing the video signal in accordance with a predetermined compression system. Specifically, the encoder 11 performs a process of compressing a video signal of a video captured by a camera or the like in accordance with a predetermined compression/encoding system, for example.

The packetizing section 12 is a part for converting the video signal compressed by the encoder 11 into predetermined packets. Thus, the video signal is converted into packets with a predetermined header and so on added thereto, and then sent to the RTP TX section 13 in a subsequent stage.

The RTP TX section 13 is a part for transmitting the packet data sent from the packetizing section 12 to the Internet network N in accordance with Real-time Transport Protocol (RTP) defined in IETF RFC 3550.

The ARC section 14 is a part for controlling a transfer rate according to an algorithm based on TCP Friendly Rate Control (TFRC) described in RFC 3448.

The RTCP section 15 is a part for controlling communication based on a real-time data transfer control protocol. The real-time data transfer control protocol is a communications protocol for hosts participating in an RTP session to exchange information about RTP. The RTCP section 15 sets a transfer rate for data communication in accordance with RTP, based on a control signal for the transfer rate of the ARC section 14.

The physical bandwidth measuring section 16 is a part for measuring a physical bandwidth of a communication channel (e.g., the Internet network N) to which the transmission apparatus 1 is connected. The physical bandwidth measuring section 16 measures the physical bandwidth of the communication channel with one of "Packet Pair," "Packet Triplet," and "ImTCP."

The enhanced slow start section 17 is a part for controlling the transfer rate of the data communication over the communication channel. Specifically, the enhanced slow start section 17 sets a threshold that does not exceed the physical bandwidth measured by the physical bandwidth measuring section 16, causes the rate of the data communication to increase exponentially up to the threshold in slow start (a slow-start phase at the start of rate control in accordance with the ARC system), causes the rate to decrease when the rate has reached or exceeded the threshold but not reached the physical bandwidth, and performs the rate control in a normal mode (normal rate control based on AIMD). While, in the present embodiment, the slow start is applied as the exponential increase in the rate, it will be understood that the present invention is not limited to this. Other manners of increasing the rate exponentially may be applied in other embodiments of the present invention.

(Structure of Reception Apparatus)

The RTP RX section 21 is a part for receiving the packet data from the Internet network N in accordance with RTP defined in IETF RFC 3550.

The depacketizing section 22 is a part for extracting the compressed video signal from the packets received via the RTP RX section 21.

The decoder 23 is a part for decoding the compressed video signal as extracted by the depacketizing section 22 in accordance with a predetermined decoding system, and outputting the decoded video signal.

The loss detection section 24 detects loss in the packets received via the RTP RX section 21, and passes information about the detected loss (Pkt Loss Info) to the ARC section 25 in a subsequent stage.

The ARC section 25 is a part for controlling the transfer rate according to the algorithm based on TFRC described in RFC 3448. The RTCP section 26 is a part for controlling the communication based on the real-time data transfer control protocol.

<Transfer Control Method>

Next, a communication control method using the communication control apparatus according to the present embodiment will now be described below. First, the physical bandwidth of the Internet network N, which is a communication channel, is measured by the physical bandwidth measuring section 16 of the communication control apparatus applied to the transmission apparatus 1.

Next, based on the measured value of the physical bandwidth, the enhanced slow start section 17 sets the threshold. The threshold is a value that does not exceed the measured physical bandwidth, and is in the range of 70% to 90% of the physical bandwidth, for example. Preferably, the threshold is set to 80% of the physical bandwidth.

Next, the video signal that is to be transferred is encoded by the encoder 11 and converted into the packets by the packetizing section 12, and in this state is transmitted to the Internet network N via the RTP TX section 13. At this time, the slow start is carried out by the enhanced slow start section 17, so that the transfer rate, which is low at first, is increased exponentially. The RTP TX section 13 sends the video signal (i.e., the packets) sequentially to the Internet network N in accordance with the increasing transfer rate.

When the increasing transfer rate has reached or exceeded the threshold previously set but not reached the physical bandwidth, the enhanced slow start section 17 sends, to the ARC section 14, a signal for issuing an instruction to decrease the transfer rate, so as to perform a process of decreasing the transfer rate. In short, when the transfer rate has reached or exceeded the threshold, the transfer rate can be considered to have become close to the physical bandwidth, and accordingly, the mode is shifted from the slow-start phase to the normal mode.

This manner of controlling the transfer rate, although the transfer rate increases exponentially at the start of the communication due to the slow start, prevents the transfer rate from exceeding the physical bandwidth as measured in advance, and allows entry into the normal mode while keeping the transfer rate close to the physical bandwidth. This makes it possible to stabilize the transfer rate in a short time.

Figure 2A:
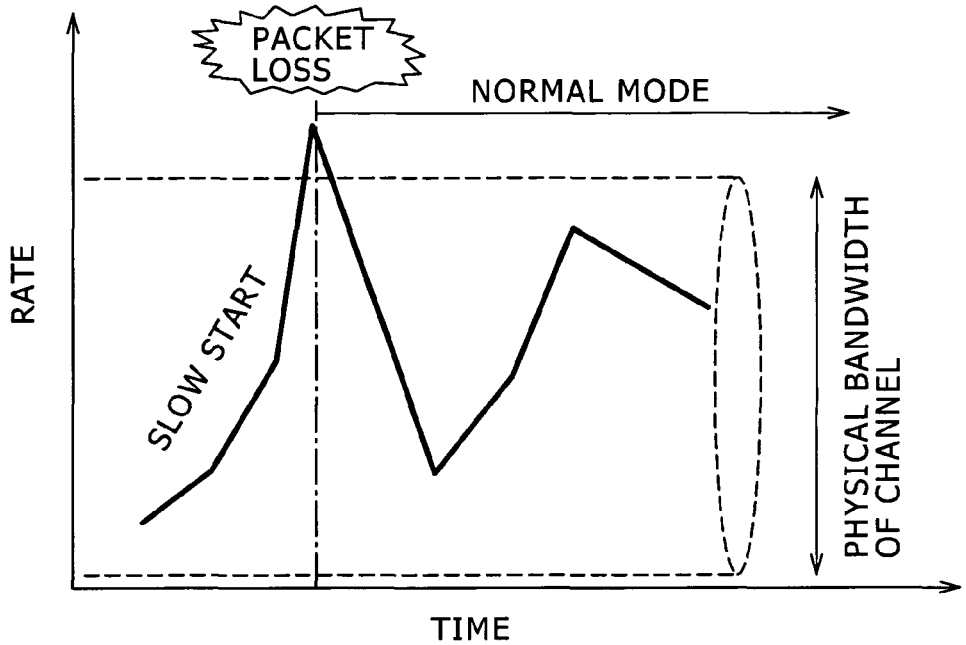
FIGS. 2A and 2B illustrate differences between a related-art transfer rate control method and a transfer rate control method according to this embodiment.
Figure 2B:
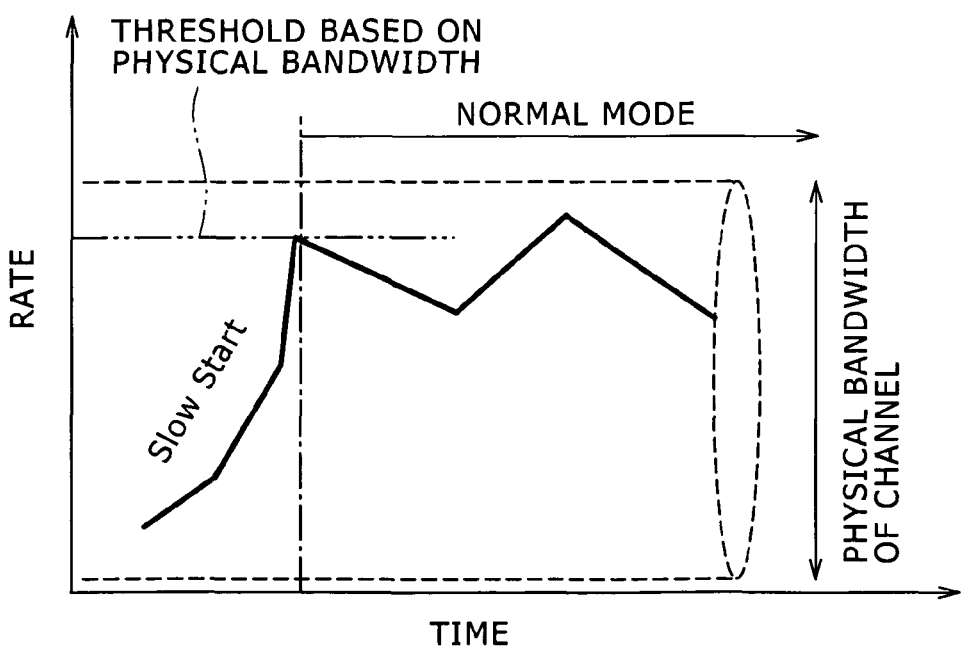

FIGS. 2A and 2B illustrate differences between a related-art transfer rate control method and the transfer rate control method according to the present embodiment. FIG. 2A illustrates a change in the transfer rate in accordance with the related-art transfer rate control method, whereas FIG. 2B illustrates a change in the transfer rate in accordance with the transfer rate control method according to the present embodiment. In each of FIGS. 2A and 2B, a horizontal axis represents time, while a vertical axis represents the transfer rate.

In the related-art transfer rate control method as illustrated in FIG. 2A, the communication starts with the slow-start phase, and the transfer rate is increased exponentially so that the transfer rate may reach a saturation rate as soon as possible. Thereafter, when the transfer rate has exceeded the physical bandwidth, a packet loss occurs, and upon detection of the packet loss, the normal mode is started to decrease the transfer rate. Then, when the transfer rate has decreased to some extent, the transfer rate is caused to increase again. The increase and decrease in the transfer rate are repeated to gradually stabilize the transfer rate.

In the transfer rate control method according to the present embodiment as illustrated in FIG. 2B, the communication starts with the slow-start phase, and the transfer rate is increased exponentially, as in the related-art transfer rate control method. In the present embodiment, however, the physical bandwidth measuring section measures the physical bandwidth of the communication channel upon start of the communication, and the threshold is set which does not exceed the measured physical bandwidth.

When the transfer rate has increased so greatly in the slow-start phase as to reach or exceed the set threshold but not reach the physical bandwidth, the mode is shifted to the normal mode. Because the transfer rate does not exceed the physical bandwidth when the mode is shifted to the normal mode, the decrease in the transfer rate that occurs in the normal mode is not as large in percentage terms as in the case of the related-art transfer rate control method.

The percentage of the decrease in the transfer rate in the normal mode may be a predetermined value corresponding to the value of the transfer rate when the mode is shifted from the slow start to the normal mode. Alternatively, the percentage of the decrease in the transfer rate in the normal mode may be set at a desired value beforehand.

This contributes to preventing a sharp decrease in the transfer rate at the time of the shift to the normal mode. After the transfer rate is decreased once, the transfer rate is caused to increase again, and then when the transfer rate has reached or exceeded the threshold but not reached the physical bandwidth, the transfer rate is decreased. The transfer rate is controlled to increase and decrease in this manner without exceeding the physical bandwidth, whereby the transfer rate is stabilized after it first exceeds the threshold.

In the above-described transfer control method, the measurement of the physical bandwidth and the setting of the threshold are performed separately from the increasing of the transfer rate in the slow-start phase. Note, however, that the measurement of the physical bandwidth and the setting of the threshold may be performed in parallel with the increase in the transfer rate in the slow-start phase upon start of the data transfer. In this case, the comparison of the transfer rate and the threshold is not performed, or the transfer rate continues to be regarded as lower than the threshold, until the setting of the threshold.

<Communication Control Program>

A communication control program according to the present embodiment is executed by a computer (e.g., the communication control apparatus according to the present embodiment). In a system that includes computers connected to each other via the communication channel, such as the Internet network, the communication control program is executed by a CPU within the computer when the data is transferred from the computer over the communication channel. Thus, the communication control program according to the present embodiment may be stored in a storage medium contained in the computer or a storage medium connected to the computer. Alternatively, the communication control program may be stored in a storage medium, such as a CD-ROM or a DVD-ROM, or delivered via a network, and loaded into the computer when executed.

FIG. 3 is a flowchart for explaining the communication control program according to the present embodiment. First, upon start of the communication, an initialization is performed in accordance with the predetermined communications protocol (step S1), and the physical bandwidth of the communication channel is measured (step S2).

The physical bandwidth is measured in a transmitting terminal participating in this communication, with one of "Packet Pair," "Packet Triplet," and "ImTCP."

Next, an initial rate is set for the slow start (step S3). Along with the setting of the initial rate, the threshold is set which does not exceed the physical bandwidth measured at step S1. The initial rate for the slow start is set to a minimum rate that has been set beforehand or to a small value below the physical bandwidth.

Next, the transfer rate, starting with the set transfer rate, is increased exponentially, in the slow start (step S4). In the slow start, the transfer rate starts with the low value and is increased exponentially so as to reach the saturation rate as soon as possible.

Then, it is determined whether or not the transfer rate, which has increased in the slow start, has reached or exceeded the threshold set previously (step S5). If it is determined that the transfer rate has neither reached nor exceeded the threshold, the data transmission is continued at the transfer rate set in the slow start (step S6), while the transfer rate is increased in the slow start.

On the other hand, if it is determined that the value of the transfer rate, which has increased in the slow start, has reached or exceeded the threshold set previously, the ARC mode is set to the normal mode (step S7), and thereafter a termination process is performed (step S8). As described above, once the transfer rate has increased so greatly in the slow start as to reach or exceed the threshold, the transfer rate is controlled to increase and decrease repeatedly in the normal mode, so that the transfer rate becomes stabilized with slight increases and decreases after the transfer rate first exceeded the threshold.

In the above-described communication control program, the measurement of the physical bandwidth and the setting of the threshold are performed separately from the increasing of the transfer rate in the slow-start phase. Note, however, that the measurement of the physical bandwidth and the setting of the threshold may be performed in parallel with the increasing of the transfer rate in the slow-start phase upon start of the data transfer. In this case, the comparison of the transfer rate and the threshold (step S5) is not performed, or the transfer rate continues to be regarded as lower than the threshold, until the setting of the threshold.

<Effects of Embodiment>

Figure 4:
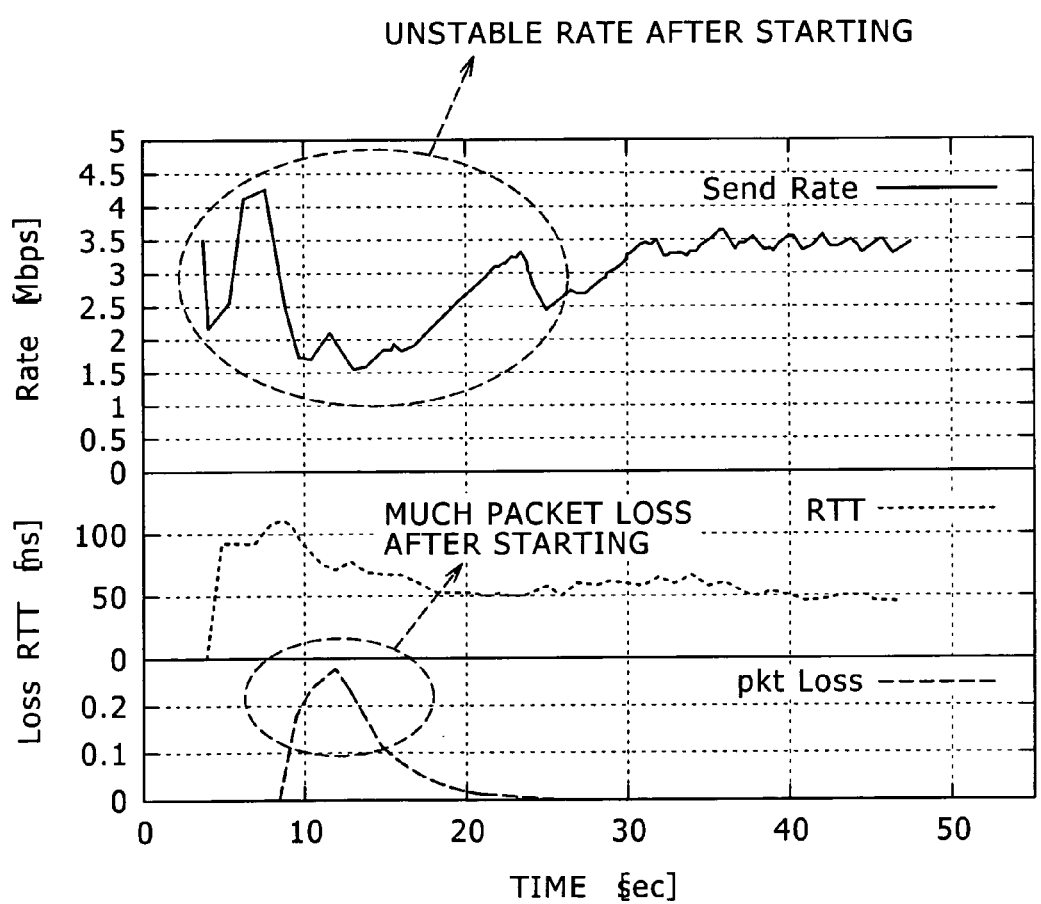
FIG. 4 illustrates rate changes in the case of a related-art communication control method.
Figure 5:
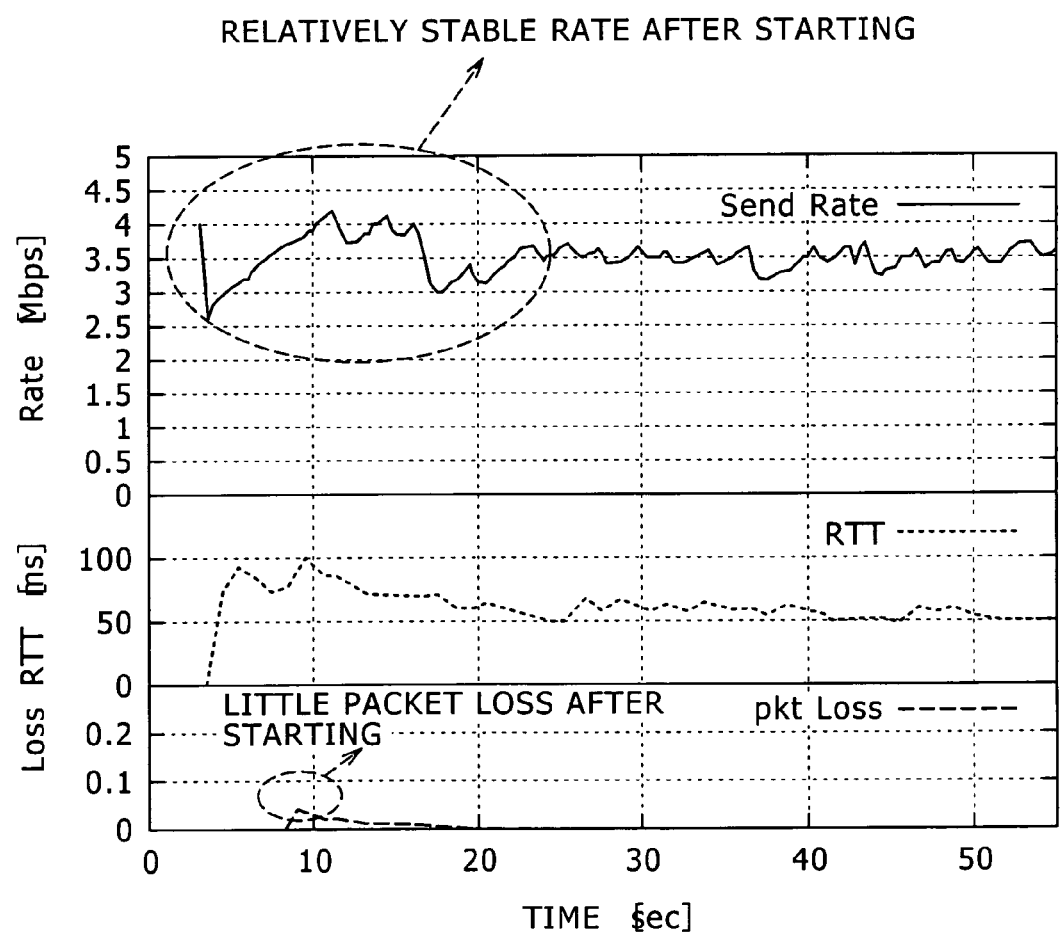
FIG. 5 illustrates rate changes in the rate in the case of a communication control method according to this embodiment.

FIG. 4 illustrates a change in the rate in the case of a related-art communication control method. FIG. 5 illustrates a change in the rate in the case of the communication control method according to the present embodiment as described above. In each of FIGS. 4 and 5, a horizontal axis represents the passage of time, while a vertical axis represents the rate (Rate [Mbps]), RTT [ms], and the packet loss (Loss).

In the case of the related-art communication control method as illustrated in FIG. 4, after the start of the communication, the transfer rate increases in the slow start, and exceeds the physical bandwidth, resulting in the shift to the normal mode, and thereafter the transfer rate increases and decreases repeatedly. During this process, as can be seen from the graph, the transfer rate is in an unstable state for more than 20 seconds.

On the other hand, in the case of the communication control method according to the present embodiment as illustrated in FIG. 5, after the start of the communication, the transfer rate increases in the slow start, and exceeds the threshold below the physical bandwidth, resulting in the shift to the normal mode, and thereafter the transfer rate increases and decreases repeatedly. As can be seen from the graph, an unstable state of the transfer rate lasts only for about 10 seconds.

As for the packet loss, in the case of the related-art communication control method as illustrated in FIG. 4, the packet loss reaches nearly 30% at its peak, whereas in the case of the present embodiment as illustrated in FIG. 5, the packet loss is only about 5% even at its peak.

Application of the present embodiment as described above makes it possible to achieve, in multimedia streaming or real-time communication, a stable communication start where the transfer rate does not exceed the physical bandwidth substantially. Because the transfer rate does not exceed the physical bandwidth substantially, burst packet loss can be prevented to make it possible to see a clear video on the receiver even in a starting phase of the communication. Moreover, because the transfer rate does not exceed the physical bandwidth, proper control over network traffic is achieved to maintain stable RTT.

It should be understood by those skilled in the art that various modifications, combinations, sub-combinations and alterations may occur depending on design requirements and other factors insofar as they are within the scope of the appended claims or the equivalents thereof.

What is claimed is:

1. A communication control apparatus, comprising:
bandwidth measuring means for measuring a physical bandwidth of data communication via a communication channel, said physical bandwidth being indicative of an allowable maximum transfer rate for the data communication via the communication channel; and
rate control means for setting a threshold transfer rate having a value less than that of the maximum transfer rate associated with the physical bandwidth measured by said bandwidth measuring means, causing a rate of the data communication to increase exponentially up to the threshold transfer rate, determining whether the rate has reached or exceeded the threshold transfer rate, and causing the rate to continue at a current rate when a determination result indicates that the rate has not exceeded the threshold transfer rate and causing the rate to decrease and the rate to be controlled based on Additive Increase Multiplicative Decrease (AIMD) when a determination result indicates that the rate has exceeded the threshold transfer rate.

2. The communication control apparatus according to claim 1, wherein said rate control means applies slow start as the exponential increase in the rate.

3. The communication control apparatus according to claim 1, wherein the threshold transfer rate is a value in a range of 70% to 90% of the physical bandwidth.

4. The communication control apparatus according to claim 1, wherein said bandwidth measuring means measures the physical bandwidth with any of "Packet Pair,""Packet Triplet," and "ImTCP."

5. A communication control method, comprising the steps of:
measuring a physical bandwidth of data communication via a communication channel, said physical bandwidth being indicative of an allowable maximum transfer rate for the data communication via the communication channel; and
setting a threshold transfer rate having a value less than that of the maximum transfer rate associated with the physical bandwidth measured, causing a rate of the data communication to increase exponentially up to the threshold transfer rate, determining whether the rate has reached or exceeded the threshold transfer rate, and causing the rate to continue at a current rate when a determination result indicates that the rate has not exceeded the threshold transfer rate and causing the rate to decrease and the rate to be controlled based on Additive Increase Multiplicative Decrease (AIMD) when a determination result indicates that the rate has exceeded the threshold transfer rate.

6. The communication control method according to claim 5, wherein the communication channel is an Internet Protocol (IP) network.

7. A non-transitory computer readable medium having stored thereon a communication control program for causing a computer to execute the steps of: measuring a physical bandwidth of data communication via a communication channel, said physical bandwidth being indicative of an allowable maximum transfer rate for the data communication via the communication channel; and setting a threshold transfer rate having a value less than that of the maximum transfer rate associated with the physical bandwidth measured, causing a rate of the data communication to increase exponentially up to the threshold transfer rate, determining whether the rate has reached or exceeded the threshold transfer rate, and causing the rate to continue at a current rate when a determination result indicates that the rate has not exceeded the threshold transfer rate and causing the rate to decrease and the rate to be controlled based on Additive Increase Multiplicative Decrease (AIMD) when a determination result indicates that the rate has exceeded the threshold transfer rate.

8. A communication control apparatus, comprising:
a bandwidth measuring section configured to measure a physical bandwidth of data communication via a communication channel, said physical bandwidth being indicative of an allowable maximum transfer rate for the data communication via the communication channel; and
a rate control section configured to set a threshold transfer rate having a value less than that of the maximum transfer rate associated with the physical bandwidth measured by said bandwidth measuring section, cause a rate of the data communication to increase exponentially up to the threshold transfer rate, determine whether the rate has reached or exceeded the threshold transfer rate, and cause the rate to continue at a current rate when a determination result indicates that the rate has not exceeded the threshold transfer rate and cause the rate to decrease and the rate to be controlled based on Additive Increase Multiplicative Decrease (AIMD) when a determination result indicates that the rate has exceeded the threshold transfer rate.

* * * * *